US008040112B2

(12) United States Patent
Kikuchi et al.

(10) Patent No.: US 8,040,112 B2
(45) Date of Patent: Oct. 18, 2011

(54) VEHICLE-USE POWER GENERATION CONTROL DEVICE

(75) Inventors: Tsukasa Kikuchi, Ama-gun (JP); Tomomi Tsuzuki, Toyota (JP)

(73) Assignee: Denso Corporation, Kariya (JP)

( * ) Notice: Subject to any disclaimer, the term of this patent is extended or adjusted under 35 U.S.C. 154(b) by 588 days.

(21) Appl. No.: 12/285,931

(22) Filed: Oct. 16, 2008

(65) Prior Publication Data

US 2009/0121689 A1    May 14, 2009

(30) Foreign Application Priority Data

Nov. 9, 2007  (JP) .................................. 2007-292195

(51) Int. Cl.
*H02P 11/00*    (2006.01)
*H02P 9/00*    (2006.01)
*H02H 7/06*    (2006.01)

(52) U.S. Cl. .............................. 322/34; 322/28; 322/36
(58) Field of Classification Search .................... 322/28, 322/34, 36
See application file for complete search history.

(56) References Cited

U.S. PATENT DOCUMENTS

| 4,262,242 | A | * | 4/1981 | Glennon ........................... 322/28 |
| 4,308,492 | A |   | 12/1981 | Mori et al. ....................... 322/28 |
| 4,470,003 | A | * | 9/1984 | Mitchell ........................... 322/23 |
| 4,543,521 | A | * | 9/1985 | Morishita et al. ............. 320/123 |
| 4,598,373 | A | * | 7/1986 | Morishita et al. .................. 701/1 |
| 4,608,639 | A | * | 8/1986 | Morishita et al. ............... 701/36 |
| 4,618,811 | A | * | 10/1986 | Mashino et al. ................. 322/28 |
| 4,651,081 | A | * | 3/1987 | Nishimura et al. ............ 320/123 |
| 4,670,705 | A | * | 6/1987 | Sievers et al. ..................... 322/28 |
| 4,689,545 | A | * | 8/1987 | Komurasaki et al. ........... 322/14 |
| 4,727,307 | A | * | 2/1988 | Kaneyuki et al. ................ 322/22 |
| 4,739,245 | A | * | 4/1988 | Komurasaki et al. ........... 322/99 |
| 4,937,514 | A | * | 6/1990 | Iwatani ........................... 322/33 |
| 5,099,189 | A | * | 3/1992 | Iwaki et al. ..................... 322/25 |
| 5,140,253 | A | * | 8/1992 | Itoh ................................. 322/28 |
| 5,144,220 | A | * | 9/1992 | Iwatani et al. .................. 322/28 |
| 5,187,350 | A | * | 2/1993 | Tsuchiya ....................... 219/203 |
| 5,355,071 | A | * | 10/1994 | Ishida et al. .................. 320/110 |
| 5,491,400 | A | * | 2/1996 | Iwatani et al. ................. 322/28 |
| 5,497,071 | A | * | 3/1996 | Iwatani et al. ................. 322/28 |

(Continued)

FOREIGN PATENT DOCUMENTS

JP        A-1-274626        11/1989

(Continued)

OTHER PUBLICATIONS

Chinese Office Action dated Sep. 9, 2010 in corresponding Chinese Application No. 200810173569.2 (with translation).

*Primary Examiner* — Pedro J Cuevas
(74) *Attorney, Agent, or Firm* — Oliff & Berridge, PLC

(57) ABSTRACT

The vehicle-use power generation control device includes a first function of detecting a temperature around a generator mounted on a vehicle, a second function of setting a target control voltage in accordance with the temperature detected by the first function, and a third function of controlling an output voltage of the generator at the target control voltage set by the second function. The second function is configured to determine the target control voltage on the basis of a target power generation voltage defining the target control voltage to be set at a predetermined temperature, and a predetermined gradient of the target control voltage with respect to the temperature detected by the first function.

5 Claims, 3 Drawing Sheets

U.S. PATENT DOCUMENTS

| | | | | |
|---|---|---|---|---|
| 5,581,172 A * | 12/1996 | Iwatani et al. | | 322/28 |
| 5,672,954 A * | 9/1997 | Watanabe | | 322/28 |
| 5,808,367 A | 9/1998 | Akagi et al. | | 290/40 C |
| 5,841,266 A * | 11/1998 | Hikita et al. | | 322/8 |
| 5,886,500 A * | 3/1999 | Iwatani et al. | | 320/104 |
| 6,316,919 B1 | 11/2001 | Sumimoto et al. | | 322/28 |
| 6,344,734 B1 * | 2/2002 | Iwatani et al. | | 322/28 |
| 6,420,855 B2 * | 7/2002 | Taniguchi et al. | | 322/28 |
| 6,424,127 B1 | 7/2002 | Ishii | | 322/36 |
| 6,486,638 B1 * | 11/2002 | Sumimoto et al. | | 322/28 |
| 6,534,959 B1 * | 3/2003 | Anderson et al. | | 322/28 |
| 6,548,990 B2 * | 4/2003 | Okuno et al. | | 322/28 |
| 6,555,993 B2 * | 4/2003 | Taniguchi et al. | | 322/28 |
| 6,700,355 B2 * | 3/2004 | Aoyama et al. | | 322/36 |
| 7,078,881 B2 * | 7/2006 | Aoyama | | 322/28 |
| 7,235,952 B2 * | 6/2007 | Maehara | | 322/24 |
| 7,285,938 B2 * | 10/2007 | Aoyama | | 322/28 |
| 7,365,520 B2 * | 4/2008 | Tsuzuki | | 322/28 |
| 7,368,893 B2 * | 5/2008 | Tsuzuki | | 322/28 |
| 7,405,541 B2 * | 7/2008 | Inokuchi et al. | | 322/8 |
| 7,952,471 B2 * | 5/2011 | Kizawa et al. | | 340/438 |
| 2002/0057074 A1 * | 5/2002 | Aoyama et al. | | 322/36 |
| 2002/0149347 A1 * | 10/2002 | Asada | | 322/28 |
| 2005/0140342 A1 * | 6/2005 | Maehara et al. | | 322/36 |
| 2005/0243491 A1 * | 11/2005 | Tanis | | 361/104 |
| 2006/0186862 A1 * | 8/2006 | Takahashi | | 322/28 |
| 2007/0057648 A1 * | 3/2007 | Tsuzuki | | 322/28 |
| 2007/0096698 A1 * | 5/2007 | Tsuzuki | | 322/28 |
| 2007/0114976 A1 * | 5/2007 | Inokuchi et al. | | 322/28 |
| 2008/0106395 A1 * | 5/2008 | Kizawa et al. | | 340/449 |
| 2009/0058372 A1 * | 3/2009 | Tsuzuki | | 322/18 |
| 2009/0211826 A1 * | 8/2009 | Hashimoto | | 180/65.275 |
| 2011/0109278 A1 * | 5/2011 | Kikuchi et al. | | 322/59 |

FOREIGN PATENT DOCUMENTS

| | | |
|---|---|---|
| JP | A-5-180055 | 7/1993 |
| JP | A-8-284719 | 10/1996 |
| JP | A-2001-145397 | 5/2001 |
| JP | A 2003-88191 | 3/2003 |
| JP | A-2007-215277 | 8/2007 |

* cited by examiner

VEHICLE-USE POWER GENERATION CONTROL DEVICE

CROSS-REFERENCE TO RELATED APPLICATION

This application is related to Japanese Patent Application No. 2007-292195 filed on Nov. 9, 2007, the contents of which are hereby incorporated by reference.

BACKGROUND OF THE INVENTION

1. Field of the Invention

The present invention relates to a vehicle-use power generation control device for controlling an output voltage of a generator mounted on a vehicle such as a passenger car or a truck.

2. Description of Related Art

There is known a vehicle-use charging system including an external control device and a power generation control device between which two-way communication can be performed. In this system, the external control device transmits a power generation control command to the power generation control device depending on a running state of a vehicle engine and a charge state of a vehicle battery detected by use of sensors in order to optimally perform power generation control in accordance with a vehicle running state, and on the other hand, the power generation control device transmits a power generation state signal to the external control device to enable performing engine control in accordance with a power generation state. For example, refer to Japanese Patent Application Laid-open No. 2003-88191.

In such a system, since the charge/discharge characteristic of the battery varies depending on its temperature, it is desirable that the external control device directs a target power generation voltage determined depending on the temperature of the battery detected by a battery temperature sensor to the power generation control device. However, in this case, the manufacturing cost of the system increases because in general battery temperature sensors are expensive. In addition, since the battery temperature sensor and the external control device have to be connected to each other by a harness, the wiring structure of the system becomes complicated.

SUMMARY OF THE INVENTION

The present invention provides a vehicle-use power generation control device comprising:

a first function of detecting a temperature around a generator mounted on a vehicle;

a second function of setting a target control voltage in accordance with the temperature detected by the first function; and a third function of controlling an output voltage of the generator at the target control voltage set by the second function;

wherein the second function is configured to determine the target control voltage on the basis of a target power generation voltage defining the target control voltage to be set at a predetermined temperature, and a predetermined gradient of the target control voltage with respect to the temperature detected by the first function.

According to the present invention, it is possible to provide a vehicle-use power generation control device capable of performing power generation control on a vehicle generator allowing for variation of battery temperature at low cost.

Other advantages and features of the invention will become apparent from the following description including the drawings and claims.

PREFERRED EMBODIMENTS OF THE INVENTION

Figure 1:
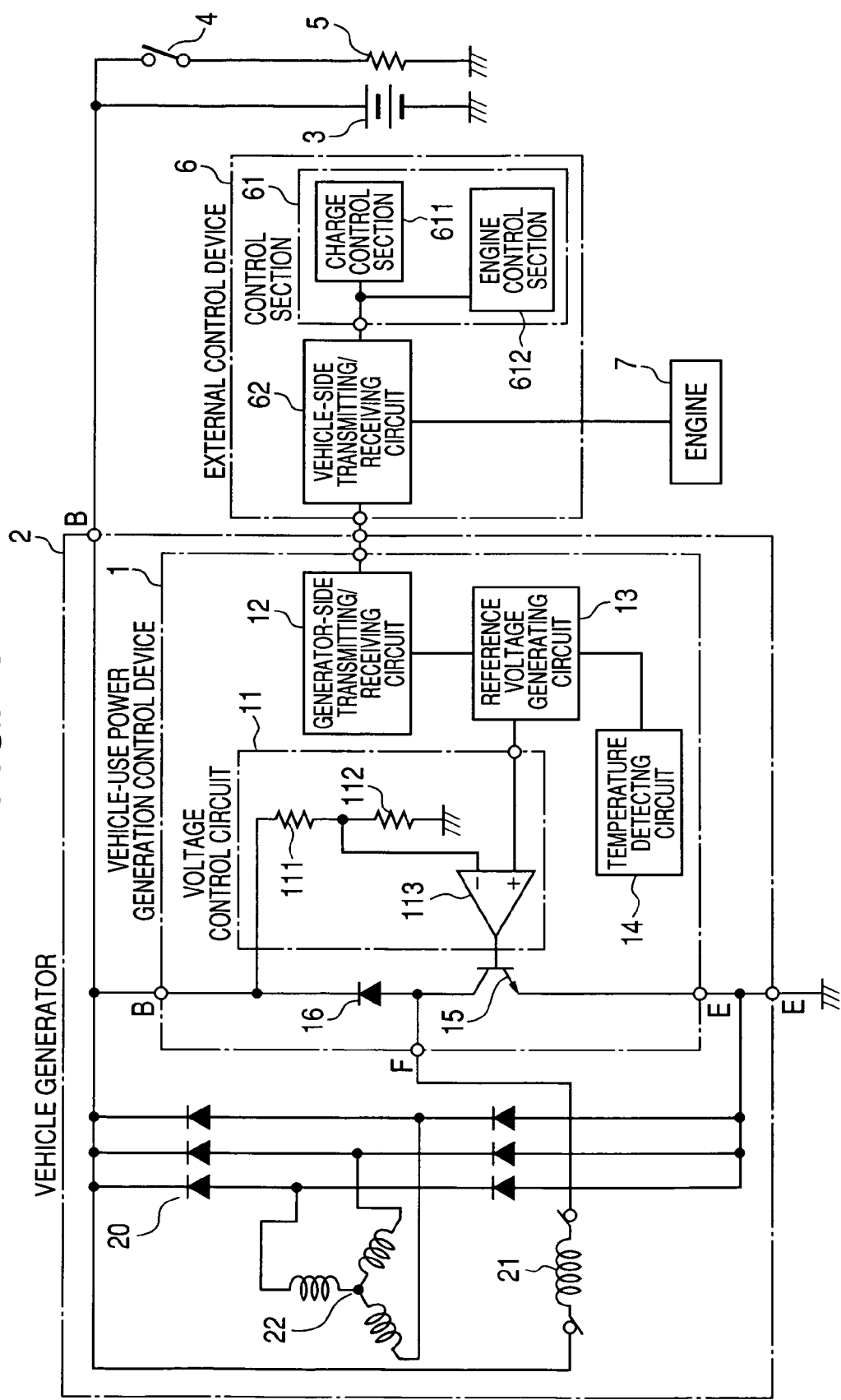
FIG. 1 is a diagram showing an overall structure of a charging system including a vehicle-use power generation control device according to an embodiment of the invention.

FIG. 1 is a diagram showing an overall structure of a charging system including a vehicle-use power generation control device according to an embodiment of the invention. As shown in FIG. 1, the charging system includes a vehicle generator 2, a battery 3, an electrical load switch 4, an electrical load 5, an external control device 6, and an engine 7.

The external control device 6 is constituted by a control section 61 including a charge control section 611 and an engine control section 612, and a vehicle-side transmitting/receiving section 62 enabling two-way communication with the engine 7 and the generator 2. The charge control section 611 generates a power generation command signal to be transmitted to the generator 2. The engine control section 612 performs rotation control of the engine 7 etc.

The generator 2, which is driven to rotate by the engine 7 through a belt and a pulley, includes a stator with a three-phase stator winding 22, a rectifier 20 for three-phase rectifying the three-phase output voltage of the three-phase stator winding 22, a rotor with a field winding 21, and the vehicle-use power generation control device 1 which operates to control the rectified output voltage of the generator 2 at a target control voltage.

The vehicle-use power generation control device 1 includes a voltage control circuit 11, a generator-side transmitting/receiving circuit 12 enabling two-way communication with the external control device 6, a reference voltage generating circuit 13 generating the target control voltage, a temperature detecting circuit 14, a switching transistor 15, and a flywheel diode 16.

The voltage control circuit 11 is constituted by resistors 111, 112 and a voltage comparator 113. The voltage comparator 113 is applied with at its positive input terminal the target control voltage outputted from the reference voltage generating circuit 13, and applied with at its negative input terminal the output voltage of the vehicle generator 2 divided down by a voltage dividing circuit constituted by the resistors 111, 112. The output terminal of the voltage comparator 113 is connected to the switching transistor 15.

The switching transistor 15 is connected to the output terminal of the voltage comparator 113 at its base, connected to the output terminal (B terminal) of the generator 2 through the flywheel diode 116 at its collector, and grounded at its emitter (E terminal). The collector of the switching transistor 15 is connected to the field winding 21. When the switching transistor 15 is turned on, an exciting current is passed to the field winding 21, and when the switching transistor 15 is turned off, the passage of the exciting current is blocked. The flywheel diode 16, which is parallel-connected to the field winding 21, suppresses surge voltage caused when the switching transistor 14 is turned off. By on/off controlling the switching transistor 15, the output voltage of the generator 2 can be controlled at the target control voltage.

The temperature detecting circuit 14 detects the temperature around the generator 2. The generator 2 and the battery 3 are disposed in the same space (in the engine room). Accordingly, there is some correlation between the temperature of the battery 3 and the temperature around the generator 2 detected by the temperature detecting circuit 14. The temperature around the generator 2 can be detected by use of an inexpensive element whose output characteristic varies depending on the temperature. The reference voltage generating circuit 13 switches the target control voltage depending on the temperature detected by the temperature detecting circuit 14 as explained in detail later.

Figure 2:
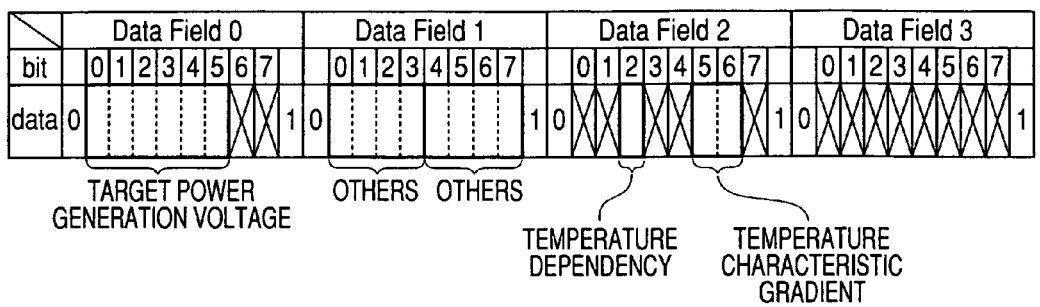
FIG. 2 is a diagram showing field and bit assignments of a power generation command signal transmitted from an external control device to the vehicle-use power generation control device in the charging system shown in FIG. 1.

Next, the operation of the charging system having the above described structure is explained. FIG. 2 is a diagram showing field and bit assignments of the power generation command signal transmitted from the external control device 6 to the vehicle-use power generation control device 1. As shown in FIG. 2, the power generation command signal includes four data fields (Data Fields 0 to 3) each of which is constituted by 10 bits. The Data Field 0 contains "target power generation voltage" represented by 6 bits. This target power generation voltage equals to the target control voltage when the temperature detected by the temperature detecting circuit 14 is at a predetermined value (for example, 25° C.). The Data Field 2 contains "temperature dependency" represented by 1 bit, and "temperature characteristic gradient" represent by 2 bits. The "temperature dependency" is for directing whether or not the target control voltage should be varied depending on the temperature detected by the temperature detecting circuit 14. When the bit of the "temperature dependency" is set to 0, it is directed that the target control voltage should be independent from the temperature, while, when the bit is set to 1, it is directed that the target control voltage should be varied depending on the temperature. The "temperature characteristic gradient" shows a gradient of the target control voltage with respect to the temperature. In this embodiment, since the "temperature characteristic gradient" is represented by 2 bits, one of four predetermined different gradients can be designated. The Data Field 1 contains two four-bit areas each storing other command (gradual excitation time, for example).

Figure 3:
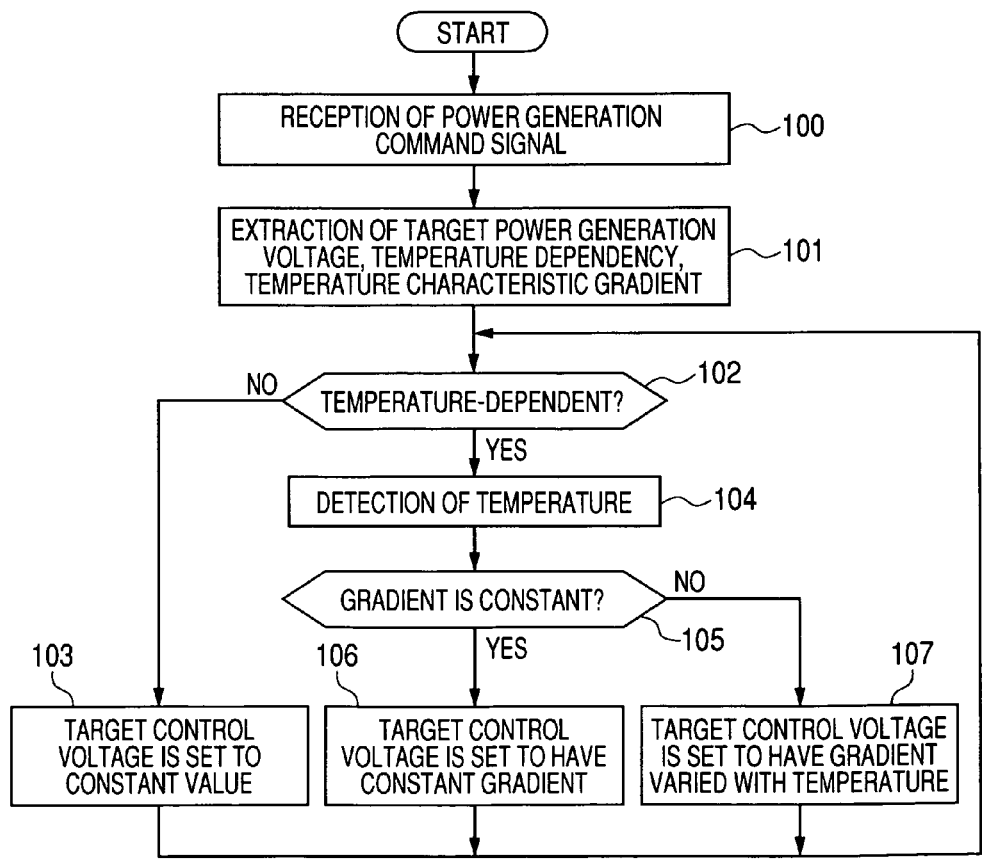
FIG. 3 is a flowchart showing procedure of setting a target control voltage by the vehicle-use power generation control device.
Figure 4:
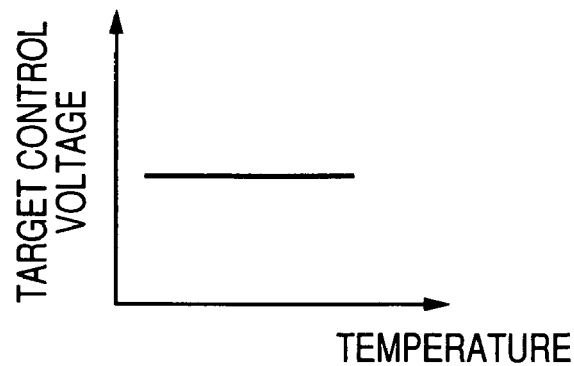
FIG. 4 is a diagram showing a relationship between the target control voltage and a temperature around a generator included in the charging system shown in FIG. 1 in the case where the target control voltage is set to a constant value independent of the temperature.

FIG. 3 is a flowchart showing the procedure of setting the target control voltage by the vehicle-use power generation control device 1. When the power generation command signal is generated by the charge control section 611 of the external control device 6, it is received by the generator-side transmitting/receiving circuit 12 of the vehicle-use power generation control device 1 (step S100). The reference voltage generating circuit 13 extracts the "target power generation voltage", "temperature dependency", and "temperature characteristic gradient" from the power generation command signal received in the generator-side transmitting/receiving circuit 12 (step S101). Next, the reference voltage generating circuit 13 determines at step S102 whether or not the target control voltage should be varied depending on the temperature on the basis of the bit content of the "temperature dependency". If the bit of the "temperature dependency" is "0", a negative determination is made at step S102, and the procedure proceeds to step S103 where the target control voltage is set to a constant value independent of the temperature. On the other hand, if the bit of the "temperature dependency" is "1", the procedure proceeds to step S104. In this case, the target power generation voltage is set as the target control voltage. FIG. 4 is a diagram showing a relationship between the target control voltage and the temperature detected by the temperature detecting circuit 14 in the case where the target control voltage is set to the constant value independent of the temperature.

Figure 5:
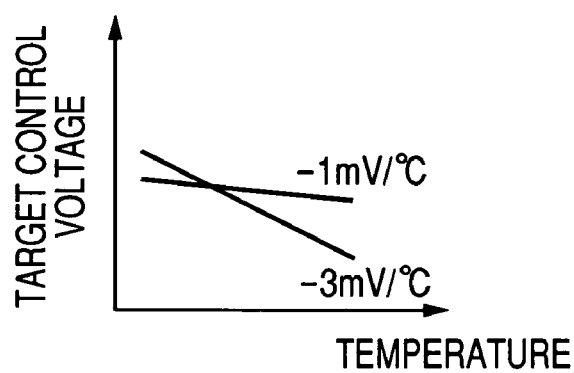
FIG. 5 is a diagram showing a relationship between the target control voltage and the temperature in the case where the gradient of the target control voltage is set constant independent of the temperature.

Returning to FIG. 3, the temperature detecting circuit 14 detects the temperature around the generator 2 at step S4, and subsequently, the reference voltage generating circuit 13 determines at step S105 whether or not the gradient of the target control voltage with respect to the temperature should be constant or not. As described above, since the "temperature characteristic gradient" is represented by 2 bits, four different values of the gradient can be defined. In this embodiment, two of the four different values are corresponded to the case (case A) where the gradient is constant, and the other two of the four values are corresponded to the case (case B) where the gradient is temperature-dependent. In the case A, since a positive determination is made at step S105, the procedure proceeds to step S106 where the reference voltage generating circuit 13 sets the target control voltage depending on the temperature detected at step S104, in accordance with the gradient defined in accordance with the "temperature characteristic gradient". Here, it is assumed that the target power generation voltage is set to 14.0 V when the temperature is 25° C., the target control voltage is varied depending on the temperature, and the "temperature characteristic gradient" defines −3 mV/° C. constant. When the temperature detected by the temperature detecting circuit 14 is 125° C., the reference voltage generating circuit 13 sets the target control voltage to 13.7 V. To be exact, since the output voltage of the generator 2 divided down by the voltage dividing circuit constituted by the resistors 111, 112 is inputted to the negative input terminal of the voltage comparator 113, the reference voltage generating circuit 13 sets the target control voltage to a voltage of 13.7 V multiplied by the dividing ratio of the voltage dividing circuit. FIG. 5 is a diagram showing a relationship between the target control voltage and the temperature in the case where the target control voltage is set depending on the temperature, and the "temperature characteristic gradient" defines a constant gradient. In this embodiment, one of the two different gradients of the target control voltage shown in FIG. 5 is selected in accordance with the "temperature characteristic gradient".

Figure 6:
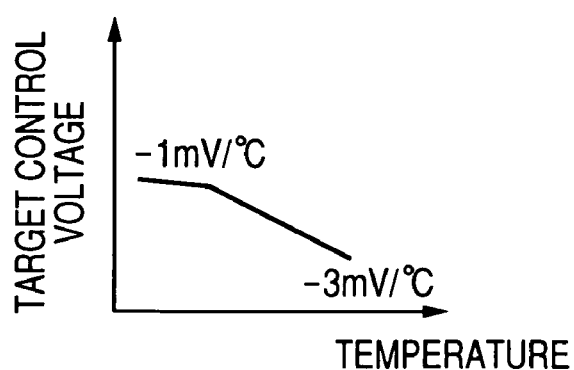
FIG. 6 is a diagram showing a relationship between the target control voltage and the temperature in the case where the gradient of the target control voltage is varied depending on the temperature.

Returning to FIG. 3, in the case B, since a negative determination is made at step S105, the procedure proceeds to step S107 where the reference voltage generating circuit 13 sets the target control voltage at the temperature detected at step S104, in accordance with the "temperature characteristic gradient" defining different gradients depending on the temperature. After the target control voltage is set through steps S103, S106, or S107, the procedure returns to step S102 to repeat the operation of setting the target control voltage. When the power generation command signal is received again, step S100 and the following steps are repeated. FIG. 6 is a diagram showing a relationship between the target control voltage and the temperature in the case where the gradient of the target control voltage is varied depending on the temperature. The determination on which of the gradient shown in FIG. 5 and the gradient shown in FIG. 6 is made on the basis of the "temperature characteristic gradient". These gradients have to be stored in the reference voltage generating circuit 13, or an external memory. Alternatively, the power generation command signal may include data showing the contents of one of these gradients.

According to the above described embodiment, the following advantages can be provided. Since it is possible to perform power generation control allowing for the battery temperature variation without a specific battery temperature sensor, the manufacturing cost can be reduced. In addition, since no harness is required for connection to a battery temperature sensor, the wiring structure can be simplified.

The target power generation voltage is set in accordance with instruction received from the external control device 6. This makes it possible to perform power generation control taking into account various data obtained by the external control device 6 showing the engine running state, vehicle state, etc., in addition to the battery temperature. The temperature dependency of the target control voltage is set in accordance with direction received from the external control device 6. This makes it possible to arbitrarily change the temperature dependency of the target control voltage, to thereby increase flexibility of power generation control. The gradient of the target control voltage may be set constant independent of the temperature. This makes it possible to appropriately control the output voltage of the generator 2 depending on the temperature variation. The gradient of the target control voltage may be varied depending on the temperature. This makes it possible, for example, to resolve insufficient charge of the battery on the lower temperature side, and to suppress battery-liquid ullage on the high temperature side. The above explained preferred embodiments are exemplary of the invention of the present application which is described solely by the claims appended below. It should be understood that modifications of the preferred embodiments may be made as would occur to one of skill in the art.

What is claimed is:

1. A vehicle-use power generation control device comprising:
   a first function of detecting a temperature around a generator mounted on a vehicle;
   a second function of setting a target control voltage in accordance with the temperature detected by the first function; and
   a third function of controlling an output voltage of the generator at the target control voltage set by the second function;
   wherein the second function is configured to determine the target control voltage on the basis of a target power generation voltage defining the target control voltage to be set at a predetermined temperature, and a predetermined gradient of the target control voltage with respect to the temperature detected by the first function.

2. The vehicle-use power generation control device according to claim 1, wherein the target power generation voltage is set in accordance with an instruction received from an external control device.

3. The vehicle-use power generation control device according to claim 1, wherein the gradient is set in accordance with an instruction received from an external control device.

4. The vehicle-use power generation control device according to claim 3, wherein the gradient is constant with respect to the temperature detected by the first function.

5. The vehicle-use power generation control device according to claim 3, wherein the gradient is varied depending on the temperature detected by the first function.

* * * * *